(12) United States Patent
Li

(10) Patent No.: US 11,238,860 B2
(45) Date of Patent: Feb. 1, 2022

(54) METHOD AND TERMINAL FOR IMPLEMENTING SPEECH CONTROL

(71) Applicant: Huawei Technologies Co., Ltd., Shenzhen (CN)

(72) Inventor: Nian Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 16/479,796

(22) PCT Filed: Jun. 13, 2017

(86) PCT No.: PCT/CN2017/088150
§ 371 (c)(1),
(2) Date: Jul. 22, 2019

(87) PCT Pub. No.: WO2018/133307
PCT Pub. Date: Jul. 26, 2018

(65) Prior Publication Data
US 2020/0175980 A1    Jun. 4, 2020

(30) Foreign Application Priority Data

Jan. 20, 2017   (CN) .......................... 201710051813.7

(51) Int. Cl.
*G10L 15/22*      (2006.01)
*G10L 15/18*      (2013.01)
(Continued)

(52) U.S. Cl.
CPC .......... *G10L 15/22* (2013.01); *G10L 15/1822* (2013.01); *G10L 15/30* (2013.01); *G10L 2015/088* (2013.01); *G10L 2015/223* (2013.01)

(58) Field of Classification Search
USPC .................................................... 704/1–504
See application file for complete search history.

(56) References Cited

U.S. PATENT DOCUMENTS 8,892,446 B2 *  11/2014  Cheyer ................. B60K 35/00
                                                            704/275
9,305,553 B2 *   4/2016  Meisel .................... G10L 15/32
(Continued)

FOREIGN PATENT DOCUMENTS

CN         1783213 A      6/2006
CN       103021403 A      4/2013
(Continued)

OTHER PUBLICATIONS

Machine Translation and Abstract of Chinese Publication No. CN103021403, Apr. 3, 2013, 78 pages.
(Continued)

*Primary Examiner* — Marcus T Riley
(74) *Attorney, Agent, or Firm* — Conley Rose, P.C.

(57) ABSTRACT

A terminal for implementing speech control records a correspondence between a first keyword text and a second keyword text. When a user inputs a speech, the terminal sends, to a first server for semantic parsing and logical parsing, the speech input by the user. Then, when the first server returns a parsing failure, the terminal obtains a parsed text returned by the first server, replaces the second keyword in the parsed text with the first keyword based on the correspondence, and then sends, to the first server, the text obtained after the replacement.

19 Claims, 8 Drawing Sheets

(51) Int. Cl.
*G10L 15/30* (2013.01)
*G10L 15/08* (2006.01)

(56) References Cited

U.S. PATENT DOCUMENTS

| | | | | |
|---|---|---|---|---|
| 9,484,030 | B1* | 11/2016 | Meaney | H04R 3/005 |
| 9,786,294 | B1* | 10/2017 | Bezos | G06F 3/167 |
| 9,875,077 | B2* | 1/2018 | Markovitz | G06F 16/638 |
| 10,074,369 | B2* | 9/2018 | Devaraj | H04L 67/306 |
| 10,276,170 | B2* | 4/2019 | Gruber | G06F 16/9537 |
| 10,474,753 | B2* | 11/2019 | Bellegarda | G10L 25/30 |
| 10,496,705 | B1* | 12/2019 | Irani | G06F 16/90332 |
| 10,691,473 | B2* | 6/2020 | Karashchuk | G06F 3/0482 |
| 10,839,159 | B2* | 11/2020 | Yang | G06N 5/022 |
| 2014/0249816 | A1 | 9/2014 | Pickering et al. | |
| 2015/0081663 | A1* | 3/2015 | Raniere | G06F 16/9535 707/708 |
| 2016/0188565 | A1* | 6/2016 | Robichaud | G06F 16/3334 704/9 |
| 2016/0350065 | A1* | 12/2016 | Markovitz | G10L 17/22 |
| 2017/0206902 | A1 | 7/2017 | Parkinson | |
| 2018/0061402 | A1* | 3/2018 | Devaraj | H04L 67/306 |
| 2018/0114531 | A1* | 4/2018 | Kumar | G10L 25/51 |
| 2018/0233140 | A1* | 8/2018 | Koishida | G06F 40/35 |
| 2018/0358014 | A1* | 12/2018 | Bang | G06F 16/29 |
| 2020/0175980 | A1* | 6/2020 | Li | G10L 15/30 |
| 2020/0265048 | A1* | 8/2020 | Dotan-Cohen | G06F 16/3329 |

FOREIGN PATENT DOCUMENTS

| | | |
|---|---|---|
| CN | 103730116 A | 4/2014 |
| CN | 104318924 A | 1/2015 |
| CN | 105488032 A | 4/2016 |
| CN | 105916090 A | 8/2016 |
| CN | 105940371 A | 9/2016 |
| CN | 106057199 A | 10/2016 |
| EP | 1632932 A1 | 3/2006 |
| WO | 2015100107 A1 | 7/2015 |
| WO | 2016033237 A1 | 3/2016 |

OTHER PUBLICATIONS

Machine Translation and Abstract of Chinese Publication No. CN106057199, Oct. 26, 2016, 18 pages.
Foreign Communication From A Counterpart Application, PCT Application No. PCT/CN2017/088150, English Translation of International Search Report dated Oct. 11, 2017, 2 pages.
Foreign Communication From A Counterpart Application, PCT Application No. PCT/CN2017/088150, English Translation of Written Opinion dated Oct. 11, 2017, 5 pages.
Foreign Communication From A Counterpart Application, European Application No. 17893471.7, Extended European Search Report dated Jan. 7, 2020, 7 pages.

* cited by examiner

METHOD AND TERMINAL FOR IMPLEMENTING SPEECH CONTROL

CROSS-REFERENCE TO RELATED APPLICATIONS

This application is a National Stage of International Patent Application No. PCT/CN2017/008150 filed on Jun. 13, 2017, which claims priority to Chinese Patent Application No. CN201710051813.7 filed on Jan. 20, 2017, both of which are hereby incorporated by reference in their entireties.

TECHNICAL FIELD

The present description relates to the field of electronic technologies, and in particular, to a method and a terminal for implementing speech control.

BACKGROUND

Speech recognition and speech control are relatively mature and widely used, for example, a mobile phone input method and in-vehicle electronic device control. A smart household is an upgraded function for a conventional home appliance. The home appliance can be remotely controlled by using intelligent terminals such as a mobile phone and a computer, and a plurality of home appliances can be simultaneously controlled or automatic repeated control can be implemented. Currently, a speech control function is also widely implemented.

Speech recognition and speech processing require a powerful processing capability, a large-capacity database, and a real-time responding capability. Therefore, currently, processing for the speech recognition is usually performed at a cloud. However, in consideration of a limitation of a processing capability of the current cloud, a manner is a control method of limiting use of a standard command. This method limits practical applicability of speech control of a common user. For example, each user or family uniquely calls a device and a room in a home. If the cloud records different names called by all users for all keywords, complex algorithm processing is needed due to an excessively large quantity of keywords. Consequently, costs are increased, a processing speed is affected, a recognition rate is reduced, a conflict is likely to occur, a success rate of speech control is affected, and further, user experience is reduced. In addition, if an IoT cloud interface is additionally added, a method in which a speech cloud reads data in an IoT cloud to obtain use of all user-defined keywords such as names of devices and rooms for recognition and parsing greatly increases costs and causes a problem in security.

SUMMARY

Some embodiments of the present description provide a method and a terminal for implementing speech control, to improve a success rate and security of personalized speech control of a user.

According to a first aspect, an embodiment of the present description provides a method for implementing speech control. The method includes: recording, by a terminal, a correspondence between a first keyword text and a second keyword text; when a user inputs a speech, sending, by the terminal to a first server for semantic parsing and logical parsing, the speech input by the user; next, obtaining, by the terminal, a parsed text returned by the first server, replacing the second keyword in the parsed text with the first keyword based on the correspondence, and then sending, to the first server, the text obtained after the replacement, when the first server returns a parsing failure; and then, receiving, by the terminal, a control command structure returned by the first server after the logical parsing succeeds, and executing a function based on the control command structure, to play a notification speech.

In the method, the terminal records the correspondence between the first keyword text and the second keyword text. When the first server cannot parse the second keyword text, the terminal replaces the second keyword text with the first keyword text based on the correspondence, and then sends, to the first server for the semantic parsing and the logical parsing, the text obtained after the replacement. In this way, a personalized speech command can be provided for the user without additionally adding processing complexity to the first server and increasing costs, and recognition accuracy is improved. In addition, a second server does not need to be added to provide a relationship description for the first keyword text and the second keyword text, and a probability of exposing personal private information of the user and all user information of an enterprise to the outside is reduced, thereby improving security.

With reference to the first aspect of the present description, in a first embodiment of the first aspect, the recording, by a terminal, a correspondence between a first keyword text and a second keyword text includes: when the user changes the first keyword text to the second keyword text, recording, by the terminal, the correspondence between the first keyword text and the second keyword text. The terminal records the correspondence at any time based on an operation of the user instead of depending on an external device. The operation is convenient, and an update speed is fast.

With reference to the first aspect of the present description, in a first embodiment of the first aspect, the recording, by a terminal, a correspondence between a first keyword text and a second keyword text includes: obtaining, by the terminal from a second server, the correspondence between the first keyword text and the second keyword text, and recording the correspondence. The second server may be a server of an Internet of Things, and records a modification operation that is about the first keyword text and the second keyword text and that is set by the user on the terminal. When the terminal interacts with the second server, the terminal may obtain the correspondence from the second server. In this method, the terminal does not need to collect and record the modification operation in real time, reducing logical processing complexity of the terminal.

With reference to the embodiments of the first aspect of the present description, in a possible implementation, that the terminal stores the correspondence between the first keyword text and the second keyword text includes: recording, by the terminal in a word list, the first keyword text, the second keyword text, and the correspondence between the first keyword text and the second keyword text.

With reference to the embodiments of the first aspect of the present description, in a possible implementation, the obtaining, by the terminal, a parsed text returned by the first server, replacing the second keyword in the parsed text with the first keyword based on the correspondence, and then sending, to the first server, the text obtained after the replacement, when the first server returns a parsing failure includes: matching, by the terminal, the second keyword text in the word list with the parsed text; and replacing, by the terminal with the corresponding first keyword, the second keyword obtained from the parsed text through matching, and sending, to the first server, the text obtained after the replacement.

With reference to the embodiments of the first aspect of the present description, in a possible implementation, the recording, by the terminal in a word list, the first keyword text, the second keyword text, and the correspondence between the first keyword text and the second keyword text includes: recording, by the terminal in different word lists, first keyword texts, second keyword texts, and correspondences between the first keyword texts and the second keyword texts based on different types of the first keyword texts.

With reference to the embodiments of the first aspect of the present description, in a possible implementation, the executing, by the terminal, a function based on the control command structure, to play a notification speech includes: replacing, by the terminal, the first keyword text in the control command structure with the corresponding second keyword text; generating, by the terminal, an executable control command based on the control command structure obtained after the replacement, and executing the control command; and generating, by the terminal, the notification speech based on the control command structure obtained after the replacement, and playing the notification speech. The terminal executes the function after replacing the first keyword text with the second keyword text, including sending a function execution command to a device or to the device through the second server, so that the device or the second server can more easily understand a meaning of the execution command. The second keyword text is played in the notification speech to avoid misunderstanding caused by the word change to the user, improving user experience.

With reference to the embodiments of the first aspect of the present description, in a possible implementation, after the replacing, by the terminal with the corresponding first keyword, the second keyword obtained from the parsed text through matching, the method further includes: keeping, by the terminal, a replacement record of the second keyword and the corresponding first keyword; and the replacing, by the terminal, the first keyword text in the control command structure with the corresponding second keyword text includes: replacing, by the terminal, the first keyword text in the control command structure with the corresponding second keyword text based on the replacement record.

With reference to the embodiments of the first aspect of the present description, in a possible implementation, the method further includes: when the terminal sends, to the first server for the semantic parsing and the logical parsing, the speech input by the user, sending, by the terminal, the correspondence between the first keyword text and the second keyword text to the first server.

According to a second aspect, an embodiment of the present description provides a terminal for implementing speech control. The terminal includes: at least one processor, and at least one memory, where the at least one memory includes several instructions. The processor executes the several instructions to enable the terminal to perform at least the following steps: recording a correspondence between a first keyword text and a second keyword text; when a user inputs a speech, sending, to a first server for semantic parsing and logical parsing, the speech input by the user; obtaining a parsed text returned by the first server, replacing the second keyword in the parsed text with the first keyword based on the correspondence, and then sending, to the first server, the text obtained after the replacement, when the first server returns a parsing failure; and receiving a control command structure returned by the first server after the logical parsing succeeds, and executing a function based on the control command structure, to play a notification speech.

With reference to the second aspect of the present description, in a first embodiment of the second aspect, in the step of recording a correspondence between a first keyword text and a second keyword text, the processor executes the several instructions to enable the terminal to perform at least the following step:

when the user changes the first keyword text to the second keyword text, recording the correspondence between the first keyword text and the second keyword text.

With reference to the second aspect of the present description, in a second embodiment of the second aspect, in the step of recording a correspondence between a first keyword text and a second keyword text, the processor executes the several instructions to enable the terminal to perform at least the following step:

obtaining, from a second server, the correspondence between the first keyword text and the second keyword text, and recording the correspondence.

With reference to the embodiments of the second aspect of the present description, in a possible implementation, in the step of recording a correspondence between a first keyword text and a second keyword text, the processor executes the several instructions to enable the terminal to perform at least the following step:

recording, in a word list, the first keyword text, the second keyword text, and the correspondence between the first keyword text and the second keyword text.

With reference to the embodiments of the second aspect of the present description, in a possible implementation, during the recording, in a word list, the first keyword text, the second keyword text, and the correspondence between the first keyword text and the second keyword text, the processor executes the several instructions to enable the terminal to perform at least the following step: recording, in different word lists, first keyword texts, second keyword texts, and correspondences between the first keyword texts and the second keyword texts based on different types of the first keyword texts.

With reference to the embodiments of the second aspect of the present description, in a possible implementation, in the step of obtaining a parsed text returned by the first server, replacing the second keyword in the parsed text with the first keyword based on the correspondence, and then sending, to the first server, the text obtained after the replacement, when the first server returns a parsing failure, the processor executes the several instructions to enable the terminal to perform at least the following steps: matching the second keyword text in the word list with the parsed text; and replacing, with the corresponding first keyword, the second keyword obtained from the parsed text through matching, and sending, to the first server, the text obtained after the replacement.

With reference to the embodiments of the second aspect of the present description, in a possible implementation, in the step of executing a function based on the control command structure, to play a notification speech, the processor executes the several instructions to enable the terminal to perform at least the following steps: replacing the first keyword text in the control command structure with the corresponding second keyword text; generating an executable control command based on the control command structure obtained after the replacement, and executing the control command; and generating the notification speech based on the control command structure obtained after the replacement, and playing the notification speech.

With reference to the embodiments of the second aspect of the present description, in a possible implementation, after the step of replacing, with the corresponding first keyword, the second keyword obtained from the parsed text through matching, the processor executes the several instructions to enable the terminal to perform at least the following step: keeping a replacement record of the second keyword and the corresponding first keyword; and the replacing the first keyword text in the control command structure with the corresponding second keyword text includes: replacing the first keyword text in the control command structure with the corresponding second keyword text based on the replacement record.

With reference to the embodiments of the second aspect of the present description, in a possible implementation, the processor further executes the several instructions to enable the terminal to perform at least the following step:

when the speech input by the user is sent to the first server for the semantic parsing and the logical parsing, sending the correspondence between the first keyword text and the second keyword text to the first server.

According to a third aspect, an embodiment of the present description provides a terminal for implementing speech control. The terminal includes a recording unit, a first sending unit, a replacement unit, and an execution unit. The recording unit is configured to record a correspondence between a first keyword text and a second keyword text. When a user inputs a speech, the first sending unit is configured to send, to a first server for semantic parsing and logical parsing, the speech input by the user. The replacement unit is configured to: when the first server returns a parsing failure, obtain a parsed text returned by the first server, replace the second keyword in the parsed text with the first keyword based on the correspondence, and then send, to the first server, the text obtained after the replacement. The execution unit is configured to receive a control command structure returned by the first server after the logical parsing succeeds, and execute a function based on the control command structure, to play a notification speech.

With reference to the third aspect of the present description, in a possible implementation, the recording unit includes: a first recoding subunit, configured to: when the user changes the first keyword text to the second keyword text, record the correspondence between the first keyword text and the second keyword text.

With reference to the third aspect of the present description, in a possible implementation, the recording unit includes: a second recoding subunit, configured to: obtain, from a second server, the correspondence between the first keyword text and the second keyword text, and record the correspondence.

With reference to the embodiments of the third aspect of the present description, in a possible implementation, the recording unit further includes: a third recoding subunit, configured to record, in a word list, the first keyword text, the second keyword text, and the correspondence between the first keyword text and the second keyword text.

With reference to the embodiments of the third aspect of the present description, in a possible implementation, the third recording subunit is configured to record, in different word lists, first keyword texts, second keyword texts, and correspondences between the first keyword texts and the second keyword texts based on different types of the first keyword texts.

With reference to the embodiments of the third aspect of the present description, in a possible implementation, the replacement unit includes: a matching subunit, configured to match the second keyword text in the word list with the parsed text; and a replacement subunit, configured to: replace, with the corresponding first keyword, the second keyword obtained from the parsed text through matching, and send, to the first server, the text obtained after the replacement.

With reference to the embodiments of the third aspect of the present description, in a possible implementation, the execution unit includes: a replacement repeating subunit, configured to replace the first keyword text in the control command structure with the corresponding second keyword text; an execution subunit, configured to generate an executable control command based on the control command structure obtained after the replacement, and execute the control command; and a speech generation subunit, configured to: generate the notification speech based on the control command structure obtained after the replacement, and play the notification speech.

With reference to the embodiments of the third aspect of the present description, in a possible implementation, the replacement unit further includes: a replacement recording subunit, configured to: after the second keyword obtained from the parsed text through matching is replaced with the corresponding first keyword, keep a replacement record of the second keyword and the corresponding first keyword, where the replacement repeating subunit is configured to replace the first keyword text in the control command structure with the corresponding second keyword text based on the replacement record.

With reference to the embodiments of the third aspect of the present description, in a possible implementation, the terminal further includes: a second sending unit, configured to: when the speech input by the user is sent to the first server for the semantic parsing and the logical parsing, send the correspondence between the first keyword text and the second keyword text to the first server.

According to a fourth aspect, an embodiment of the present description provides a computer readable storage medium, including an instruction. When the instruction runs on a computer, the computer performs the method according to the embodiments of the first aspect.

According to a fifth aspect, an embodiment of the present description provides a computer program product including an instruction. When the instruction runs on a computer, the computer performs the method according to the embodiments of the first aspect.

BRIEF DESCRIPTION OF DRAWINGS

To describe the technical solutions in embodiments of the present description more clearly, the following briefly describes the accompanying drawings required for describing the embodiments. Same reference numerals in the accompanying drawings represent corresponding parts. Obviously, the accompanying drawings in the following descriptions are merely some but not all embodiments of the present description. For persons of ordinary skill in the art, other drawings may be obtained according to these accompanying drawings without creative efforts.

DESCRIPTION OF EMBODIMENTS

The terms used in the embodiments of the present description are merely used for the purpose of describing specific embodiments, but are not intended to limit the present description. The terms "one", "a", "the", "the foregoing", and "this" of singular forms used in this specification and the appended claims of the present description are also intended to include plural forms, unless otherwise specified in the context clearly. It should be further understood that, the term "and/or" used in the present description indicates and includes any or all possible combinations of one or more bound listed items.

The following describes a terminal, a device, a server, a system, and an embodiment in which the terminal cooperates with the server to implement speech control in the embodiments of the present description, to improve accuracy and a success rate of speech control.

Speech recognition and speech control are relatively mature and widely used, for example, a mobile phone input method and in-vehicle electronic device control. Currently, a speech control function is widely implemented for operation control on a smart household. The smart household is an upgraded function for a conventional home appliance. The home appliance can be remotely controlled by using intelligent terminals such as a mobile phone and a computer, and a plurality of home appliances can be simultaneously controlled or automatic repeated control can be implemented. Currently, the speech control function is widely implemented. A user says a control command to a mobile phone or a control terminal supporting speech input, to operate a home appliance device. The latter speech control terminal has many forms, for example, a smart sound box, a router, a camera, and a dedicated speech control terminal. Intelligent devices supporting speech control are collectively referred to as "terminals" or "speech terminals" in the following description.

Speech recognition and speech processing require a powerful processing capability, a large-capacity database, and a real-time responding capability. Therefore, currently, processing for the speech recognition is usually performed at a cloud (where the cloud is referred to as a "speech cloud" in the following, and is mainly a server cluster in a calculation center and has powerful storage and processing capabilities). To be specific, a terminal sends a speech of a user to the speech cloud. A server of the speech cloud performs recognition and processing, converts the speech into a text, a data structure of a control command, or the like, and then returns, to the terminal, data obtained through conversion. The terminal converts the data into a home appliance control command to implement a control intention of the user. Generally, the speech cloud does not serve only the smart household. The speech cloud further supports other speech services of a mobile phone and an in-vehicle electronic device. A separate operator provides a service for the speech cloud.

Figure 1:
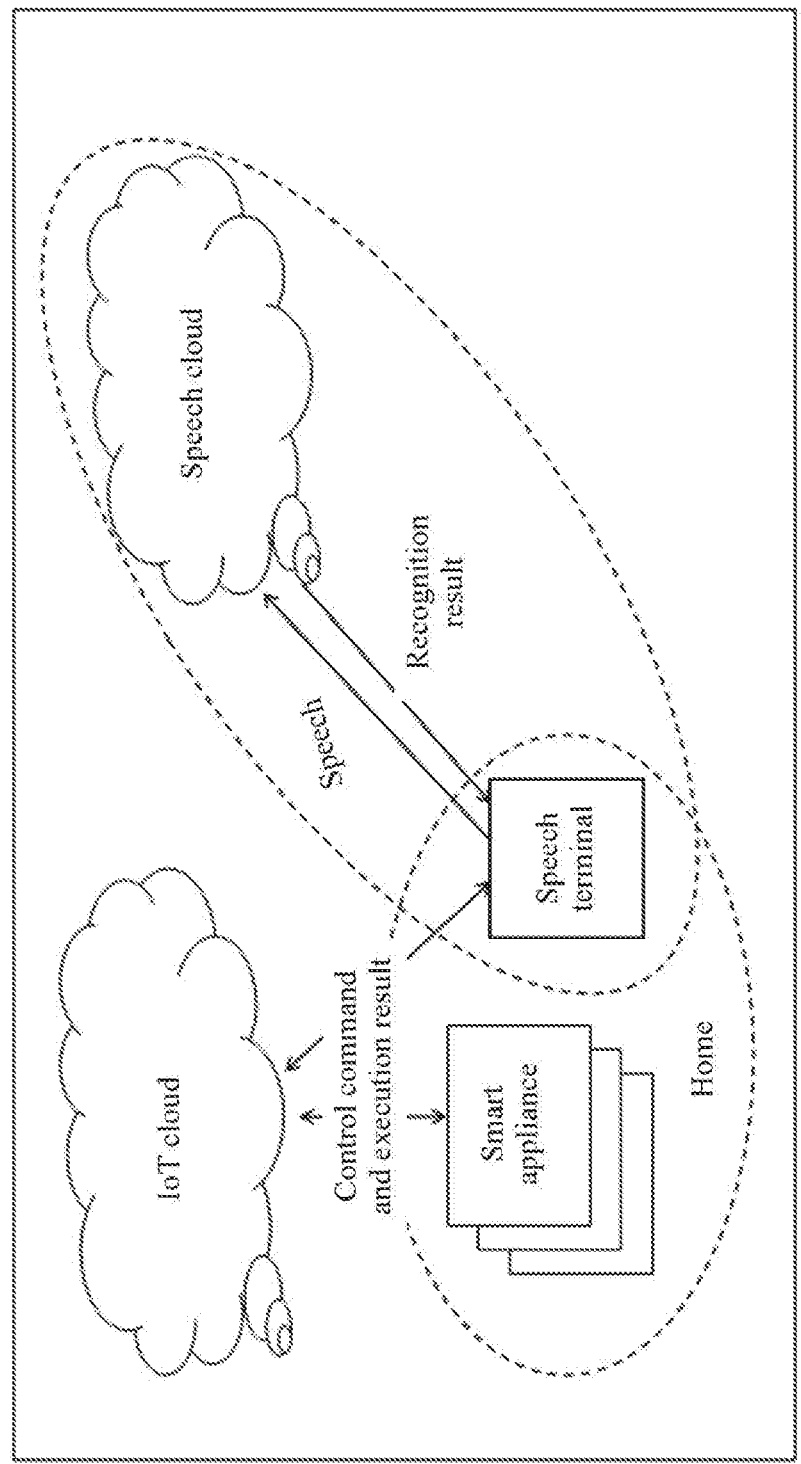
FIG. 1 is a schematic structural diagram of a system for implementing speech control according to an embodiment of the present description.

A smart home system is used as an example. FIG. 1 is a diagram of networking of a current common smart home system. A system architecture in the present description uses a speech control system in which speech recognition and semantic recognition are performed based on a speech cloud. The system includes a terminal, a device, and one or more servers.

In some embodiments of the present description, the intelligent device may be a smart appliance, including various devices such as an audio and video device, a lighting system, curtain control, air conditioner control, a security protection system, a digital theater system, an audio and video server, a movie box system, and an Internet appliance that are controlled and managed based on an Internet of Things technology in a home. An electronic device has a data processing capability. The electronic device can not only provide a conventional living function, but also support a user in performing intelligent functions such as remote control and timing control through a network by using a terminal. It should be further understood that, in some other embodiments of the present description, the smart appliance may alternatively be another device that needs to perform network attachment connection and that can implement network attachment connection through cooperation with a terminal.

In some embodiments, the smart appliance is, for example, a smart television. In addition to apparatuses such as a display and a speaker of a common television, the smart television further includes a processor, a memory, and a network connection apparatus. The smart television can carry various operating systems, and can be connected to the Internet. The smart television may be similar to a terminal in supporting interactive applications in a plurality of manners, for example, installing, updating, and deleting an application according to a user.

In some embodiments of the present description, the terminal may be a portable electronic device that further includes another function such as a personal digital assistant and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device such as a laptop computer (Laptop) including a touch-sensitive surface (for example, a touchpad). It should be further understood that, in some other embodiments of the present description, the terminal may be a device that can be used as a mobile security agent such as a remote control or an intelligent environment detector that complies with a same standard.

Figure 2:
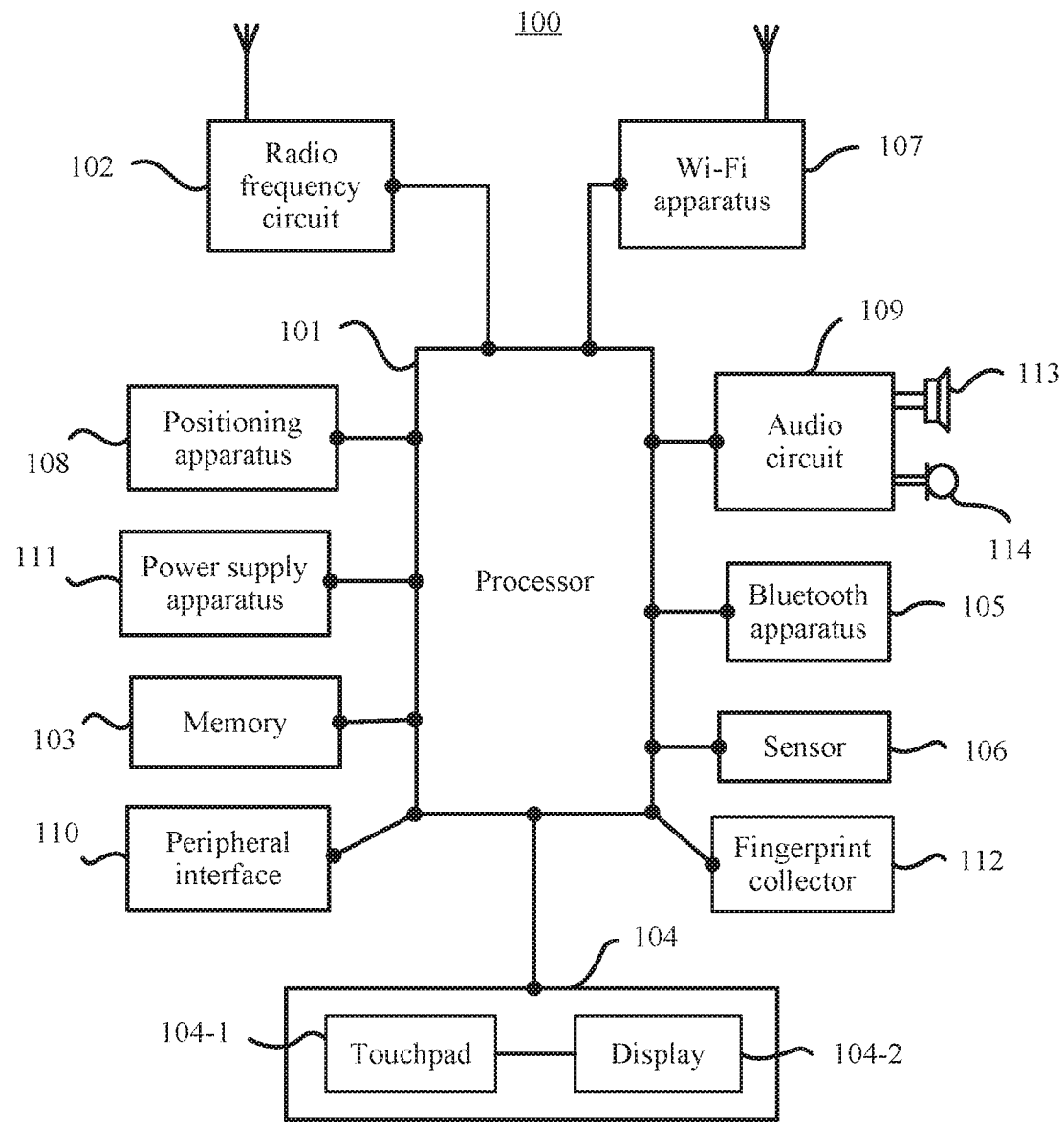
FIG. 2 is a schematic structural diagram of a terminal according to an embodiment of the present description.

As shown in FIG. 2, the terminal in the embodiments of the present description may be a mobile phone 100. The following describes an embodiment in detail by using the mobile phone 100 as an example. It should be understood that the mobile phone 100 shown in the figure is merely an example of the terminal, and the mobile phone 100 may have more or fewer components than those shown in the figure and may combine two or more components or have different component configurations. Various components shown in the figure may be implemented in hardware that includes one or more signal processors and/or application-specific integrated circuits, in software, or in a combination of hardware and software.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). Persons skilled in the art may understand that a hardware structure shown in FIG. 2 does not constitute a limitation on the mobile phone 100, and the mobile phone 100 may include more or fewer components than those shown in the figure, or may combine some components, or have different component arrangements.

The following describes components of the mobile phone 100 in detail with reference to FIG. 2.

The processor 101 is a control center of the mobile phone 100. The processor 101 is connected to all parts of the mobile phone 100 by using various interfaces and lines, and runs or performs an application program (which may be referred to as app for short in the following) stored in the memory 103 and invokes data and an instruction stored in the memory 103, to execute various functions of the mobile phone 100 and process data. In some embodiments, the processor 101 may include one or more processing units. An application processor and a modem processor may be integrated into the processor 101. The application processor mainly processes an operating system, a user interface, an application program, and the like. The modem processor mainly processes wireless communication. It may be understood that the modem processor may not be integrated into the processor 101. The processor 101 may be an integrated chip. In some embodiments of the present description, the processor 101 may further include: a fingerprint verification chip, configured to verify a collected fingerprint.

The radio frequency unit 102 may be configured to receive and send a radio signal in an information receiving and sending process or in a call process. Specifically, after receiving downlink data from a base station, the radio frequency circuit 102 may send the downlink data to the processor 101 for processing. In addition, the radio frequency circuit 102 sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication. The communications standard or protocol includes but is not limited to Global System for Mobile Communications, a general packet radio service, Code Division Multiple Access, Wideband Code Division Multiple Access, Long Term Evolution, an email, a short message service, and the like.

The memory 103 is configured to store an application program and data. The processor 101 runs the application program and the data stored in the memory 103, to execute various functions of the mobile phone 100 and process data. The memory 103 mainly includes a program storage area and a data storage area. The program storage area may store an operating system and an application program required by at least one function (for example, a sound play function or an image play function). The data storage area may store data (for example, audio data or a phone book) created based on use of the mobile phone 100. In addition, the memory 103 may include a high-speed random access memory, or may include a nonvolatile memory such as a magnetic disk storage device, a flash memory device, or another volatile solid-state storage device. The memory 103 may store various operating systems such as an iOS® operating system developed by Apple and an Android® operating system developed by Google.

The touchscreen 104 may include a touchpad 104-1 and a display 104-2. The touchpad 104-1 can collect a touch event performed by a user on or near the mobile phone 100 (for example, an operation performed by the user on the touchpad 104-1 or near the touchpad 104-1 by using any proper object such as a finger or a stylus), and send collected touch information to another component such as the processor 101. The touch event performed by the user near the touchpad 104-1 may be referred to as a floating touch. The floating touch may mean that the user does not need to directly touch the touchpad for selecting, moving, or dragging an object (for example, an icon), and the user only needs to be near the terminal to execute a desired function. In an application scenario of the floating touch, terms such as "touch" and "contact" do not mean to directly touch the touchscreen, but to be near or close to the touchscreen. The touchpad 104-1 on which the floating touch can be performed may be implemented by using a capacitive touchpad, an infrared light touchpad, and an ultrasonic touchpad. The touchpad 104-1 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, and then sends the coordinates of the touch point to the processor 101. The touch controller can further receive and execute an instruction sent by the processor 101. In addition, the touchpad 104-1 may be implemented in a plurality of types such as a resistive type, a capacitive type, an infrared type, and a surface acoustic wave type. The display (also referred to as a display screen) 104-2 may be configured to display information input by the user or information provided for the user, and various menus of the mobile phone 100. The display 104-2 can be configured in a form of a liquid crystal display, an organic light emitting diode, or the like. The touchpad 104-1 may cover the display 104-2. When detecting the touch event on or near the touchpad 104-1, the touchpad 104-1 transfers the touch event to the processor 101 to determine a type of the touch event. Then, the processor 101 can provide corresponding visual output on the display 104-2 based on the type of the touch event. Although the touchpad 104-1 and the display screen 104-2 in FIG. 2 are used as two independent parts to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of the present description, only the touchpad (layer) and the display screen (layer) are displayed, and another layer is not recorded in this embodiment of the present description. In addition, in some other embodiments of the present description, the touchpad 104-1 may cover the display 104-2, and a size of the touchpad 104-1 is greater than a size of the display screen 104-2. Therefore, the display screen 104-2 is all covered by the touchpad 104-1, or the touchpad 104-1 may be configured on the front of the mobile phone 100 in a full panel manner, in other words, the mobile phone can sense each touch performed by the user on the front of the mobile phone 100. In this way, full touch control experience on the front of the mobile phone can be implemented. In some other embodiments, the touchpad 104-1 is configured on the front of the mobile phone 100 in a full panel manner, and the display screen 104-2 may also be configured on the front of the mobile phone 100 in a full panel manner. In this way, a bezel-less (Bezel) structure can be implemented on the front of the mobile phone.

In this embodiment of the present description, the mobile phone 100 may further have a fingerprint recognition function. For example, a fingerprint sensor may be configured on the back of the mobile phone 100 (for example, a lower part of a rear-facing camera), or a fingerprint sensor is configured on the front of the mobile phone 100 (for example, a lower part of the touchscreen 104). Details are not described herein.

The mobile phone 100 may further include the Bluetooth apparatus 105, configured to implement short-range data exchange between the mobile phone 100 and another terminal (for example, a mobile phone or a smartwatch). The Bluetooth apparatus in this embodiment of the present description may be an integrated circuit, a Bluetooth chip, or the like.

The mobile phone 100 may further include at least one type of sensor 106 such as a light sensor, a motion sensor, or another sensor. Specifically, the light sensor may include an ambient light sensor and a proximity sensor. The ambient light sensor may adjust luminance of the display of the touchscreen 104 based on brightness of ambient light, and the proximity sensor may turn off a power supply of the display when the mobile phone 100 moves to an ear. As a type of the motion sensor, an accelerometer sensor may detect acceleration values in all directions (usually, three axes), may detect a value and a direction of gravity in a static mode, and may be used in an application for recognizing a mobile phone posture (for example, landscape-to-portrait switch, a related game, and magnetometer posture calibration), a function related to vibration recognition (for example, a pedometer or a knock), and the like. A gyroscope, a barometer, a hygrometer, a thermometer, an infrared sensor, and another sensor may be further configured on the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides a wireless broadband Internet access for the user. In some other embodiments, the Wi-Fi apparatus 107 may also be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a Global Positioning System (GPS), a BeiDou Navigation Satellite System, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may be a receiver of an Assisted Global Positioning System (AGPS). The AGPS is a running manner of performing GPS positioning with assistance. The AGPS may enable positioning of the mobile phone 100 to be faster by using a signal of the base station and through cooperation with a GPS satellite signal. In the AGPS system, the positioning apparatus 108 may obtain positioning assistance by communicating with an assisted positioning server (for example, a mobile phone positioning server). The AGPS system is used as an assisted server to assist the positioning apparatus 108 in completing ranging and positioning services. In this case, the assisted positioning server provides positioning assistance by communicating with a terminal such as the positioning apparatus 108 (a GPS receiver) of the mobile phone 100 by using a wireless communications network. In some other embodiments, the positioning apparatus 108 may also be a positioning technology based on a Wi-Fi access point. Each Wi-Fi access point has one globally unique MAC address. The terminal can scan and collect a broadcast signal of a surrounding Wi-Fi access point when Wi-Fi is enabled. Therefore, the terminal can obtain a MAC address broadcast by the Wi-Fi access point. The terminal sends, to a location server by using the wireless communications network, such data (for example, the MAC address) that can identify the Wi-Fi access point. The location server retrieves a geographic location of each Wi-Fi access point, obtains the geographic location of the terminal through calculation with reference to strength of a Wi-Fi broadcast signal, and sends the geographic location of the terminal to the positioning apparatus 108 of the terminal.

The audio circuit 109, a loudspeaker 113, and a microphone 114 may provide audio interfaces between the user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts a collected sound signal into an electrical signal, and the audio circuit 109 receives the electrical signal, converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone 100, an external memory, or a subscriber identity module card). For example, the terminal is connected to the mouse by using a universal serial bus (USB) interface, and the terminal is connected, by using a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

The mobile phone 100 may further include a power supply apparatus 111 (for example, a battery or a power supply management chip) that supplies power to the components. The battery may be logically connected to the processor 101 by using the power supply management chip, so that functions such as charging management, discharging management, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein. The following embodiments may be implemented in the mobile phone 100 having the foregoing structure.

The server may be a cloud server. The cloud server is a service device that is based on an Internet calculation manner, has calculation and storage capabilities, and provides shared software and hardware resources and information for various computer terminals and other devices based on a requirement. The cloud server may be a speech cloud.

With reference to FIG. 1, in a specific embodiment, the system may include the following:

In terms of a smart appliance, the smart appliance is a home appliance device that is used by a user and that can be connected to a network, can be remotely controlled, and can automatically run based on a command, some smart appliances also have a programming function and a timing function, and the smart appliance is an upgrade for a conventional home appliance.

In terms of a control terminal, the control terminal is a control device that runs control software, and is usually in two forms: a fixed control terminal and a mobile control terminal. The mobile control terminal is usually an intelligent device such as a smartphone or a tablet, and the fixed control terminal is usually a non-intelligent device such as a panel or a switch. The present description improves the former mobile intelligent terminal. The mobile control terminal may communicate with a device inside a home (at a location of a "control terminal 1" in the figure) by using a home wireless local area network, or may communicate with a device outside a home (at a location of a "control terminal 2" in the figure) by using the Internet.

In terms of an IoT cloud (an Internet of Things cloud), to process and control a device status when the control terminal cannot directly communicate with the device, communication between the device and the control terminal needs to be performed by using a control server, namely, the "IoT cloud", and the IoT cloud forwards a message and a command between the device and the control terminal. The IoT cloud also records and executes these messages/commands.

In terms of a speech cloud, the speech cloud is not a composition part of a smart home but a third-party service provider, and the speech cloud provides a function of converting a speech into a text and converting a text into an executable command data structure.

The speech cloud and the smart household system are two independently running entities that communicate with each other by using the Internet. Communication content is the foregoing "speech-to-text" interaction process. In addition, the smart household system further includes many composition parts such as a "smart household cloud" ("IoT cloud" for short) that controls and manages a home device, smart appliance devices in a large quantity of homes of users, and a terminal that controls a home appliance (for example, a smartphone or a speech terminal with control software). In this method, after the terminal recognizes a correct user control command, a subsequent control process is the same as an original process in which the user manually operates an app interface on the terminal. Therefore, this method involves only two devices: the speech cloud and the terminal. A function and a processing process of another device are not described.

With development of a database technology, an artificial intelligence technology, and a server processing capability, the current speech cloud can achieve very high recognition accuracy, and can convert any speech into a text. In addition, speech recognition can achieve a very high degree of intelligence and accuracy in many public services such as booking and query.

Figure 3:
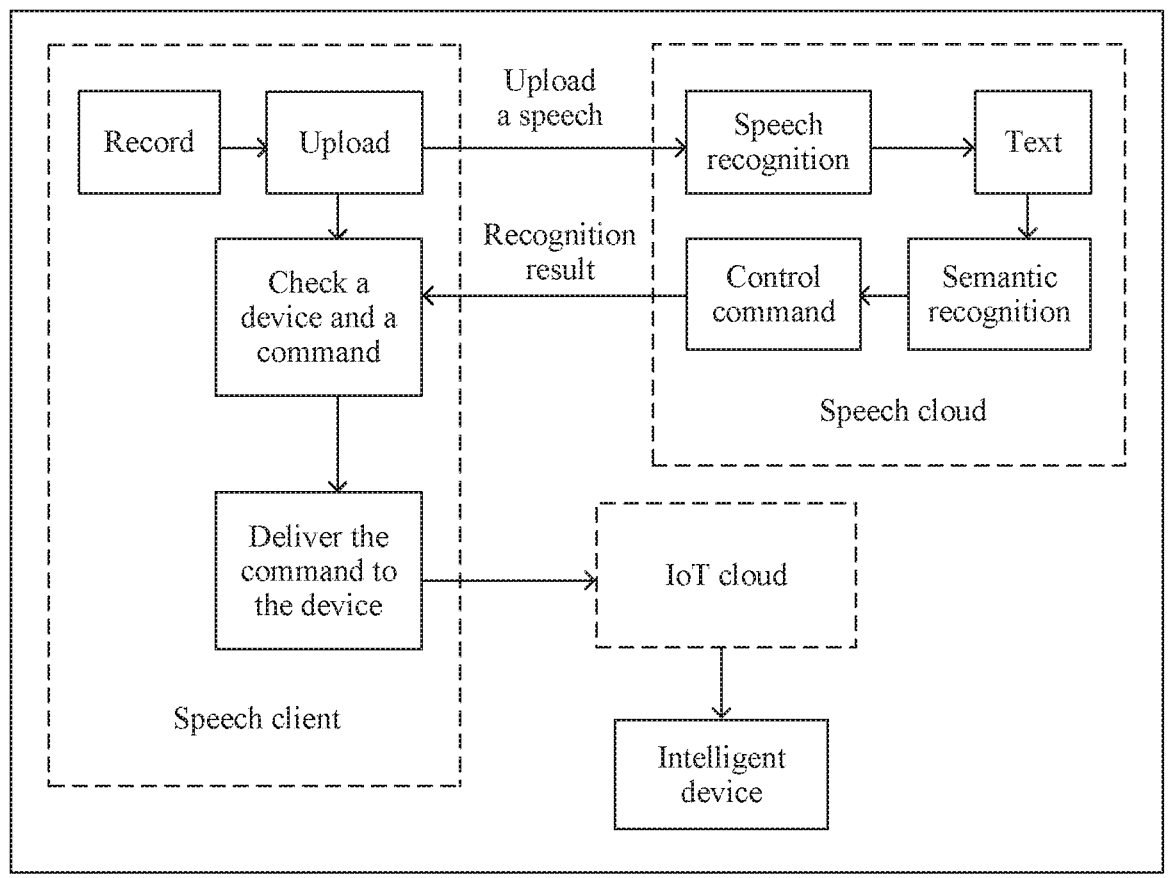
FIG. 3 is a schematic flowchart of a method for implementing speech control according to an embodiment of the present description.

In some embodiments of the present description, a procedure of implementing speech control in a smart household service is shown in FIG. 3.

In home appliance speech control, an expression manner of "operation+device+purpose" is usually used. For example, for a type of standard use like "set an air conditioner in a living room to 26 degrees", the speech cloud can correctly recognize that an operation object is the "air conditioner", a location is the "living room", an action is "adjust temperature", and a target parameter is "26 degrees", and return the following correct data structure based on such a processing result:

```
{
    "dev", "air conditioner"
    "op", "set"
    "temp", "26"
    "loc", "living room"
}
```

In order that the speech cloud can fully recognize such type of control command, the control command needs to include a corresponding keyword. For example, the control command needs to include the "air conditioner", to determine that "26" indicates temperature. After receiving such data with complete parameters, the terminal can generate a corresponding control command and learn of a device to be controlled. When providing this type of service, the speech cloud has learned and summarized a large quantity of devices such as an "air conditioner", a "refrigerator", and a "lamp", has designed a corresponding control parameter combination for each type of device, and has defined rooms in a home as standard use such as a "living room", a "bedroom", and a "corridor". In addition, the speech cloud further performs corresponding processing on various possible word sequences and modal particles, and has very high accuracy for speech commands within a standard expression range.

When a control command lacks a keyword or a keyword description in a control command does not comply with a predefined keyword, the speech cloud can recognize a text from the speech (converting the speech into the text), but fails in parsing the command. For example, "turn on an air conditioner in a living room" complies with predefined keywords and can be converted into a command through parsing. However, when a user changes the "living room" to a "large room", if the "large room" is not defined in the keywords, the speech cloud fails in parsing the command. The speech cloud returns a parsed text character string and an error code instead of a data structure of the control command to the terminal. The terminal notifies the user of "an unrecognizable command, please say it again". In this case, because the speech cloud lacks a user-defined keyword, either of the following failure results is caused regardless of how the user changes description: When a user-defined non-standard keyword is used, the speech cloud cannot recognize the keyword; and when a standard keyword predefined in a speech recognition system is used, the speech cloud can recognize a data structure of the command, but the terminal cannot find a target device that needs to be controlled because the command is different from a description performed by the user in the smart household. In this case, the smart household keeps asking the user to try different control speech descriptions, but the user always fails in controlling. As a result, the user does not trust the speech control and has poor impression for the speech control. In addition, the speech cloud collects as many "non-standard keywords" as possible and standardizes these keywords, to improve and provide more comprehensive functions. For example, keywords such as a "large room" and a "small room" are added to a description of a "room". A success rate of parsing a command is improved by using a method of enlarging a set that can be processed. As a result, obvious problems of greatly increasing computing complexity, decreasing a processing speed, and decreasing a recognition rate are caused. To avoid these problems, in this embodiment of the present description, in home intelligence services, actually occurring locations and effective ranges of personalized settings (modifying a keyword) of different users are inside homes of the users. Based on such a feature, a client (a terminal) operated by a user can sense and differentiate the modification. The terminal obtains a correspondence with a personalized keyword by recognizing a modification of the user for a standard keyword, and replaces a personalized part that cannot be recognized by the speech cloud, thereby implementing an expanded function by using a basic capability of the client. The personalized keyword of the user is not limited. Personalized keywords of all users do not need to be submitted to the cloud and do not need to be developed and upgraded by the cloud. Regardless of how the user makes a modification, same software may be locally used to obtain a modified value, and perform replacement and inverse replacement. This resolves a prior-art problem in which status of all users is exposed to a third party.

In this embodiment of the present description, based on a calculation capability of the terminal and a feature of performing processing on an individual user, a speech recognition process that originally cannot be resolved or that is fully processed by the speech cloud is divided into two phases: a standard phase and a non-standard phase. A non-standard keyword is locally replaced with a standard keyword in a terminal of the user, and a personalized information range is limited to the terminal. In an original solution, a personalized part needs to be submitted to the cloud for recognition. A speech control command is recognized by using a two-step iteration process. This is different from a prior-art solution in which a result is directly returned after submission is performed once. In this way, personalized language use of the user that is modified by the user can immediately take effect in speech control, and the personalized language use can be immediately recognized regardless of a specific value obtained after the modification. The speech cloud does not need to make a modification. An inter-cloud interface is not needed, reducing a risk of information leakage.

In the present description, the problem is resolved from a source of a personalized setting of the user, in other words, a modification of the user for a standard keyword. The personalized setting of the user is related only to a specific family or person and does not need to be centralized to the speech cloud for processing. In the prior-art solution, the speech cloud needs to recognize a user, obtain a personalized keyword, and then perform matching. Actually, personalized processing is performed in a centralized common processing process. This solution is characterized by low efficiency and high costs. A terminal side can determine a standard keyword that is changed by each user to a non-standard value, so that the speech cloud does not need to perform further differentiation. In that case, the speech cloud needs to perform differentiated processing when different smart household service providers provide different keyword modification ranges, and the user performs a modification on the keyword; consequently, the processing becomes multi-level processing, and a large amount of development and low execution efficiency are caused. The speech terminal is a part of the smart household system, and types of keywords that can be modified by the user are known from a design, so that whether the user actually makes a modification and a specific value obtained after the modification can be read without an information risk.

Figure 8:
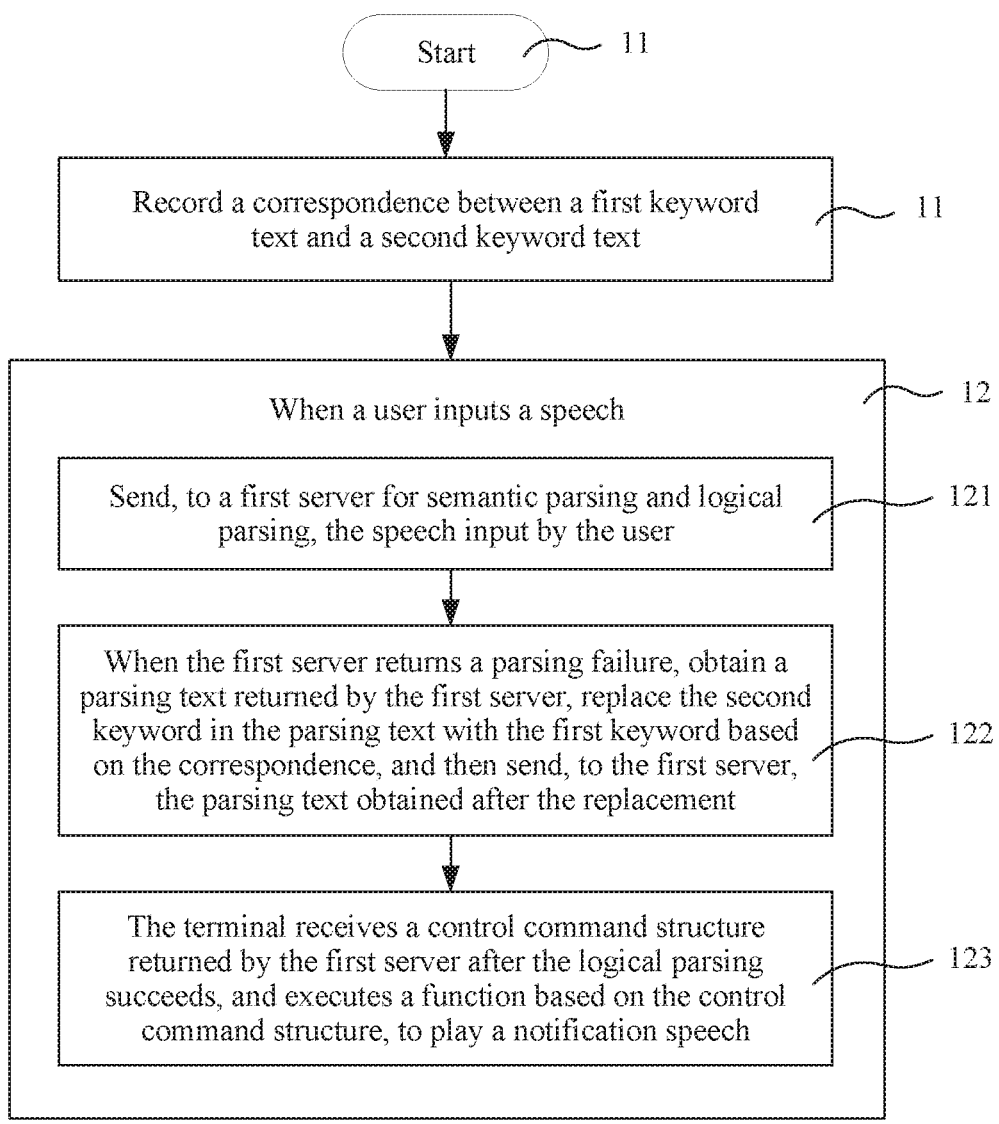
FIG. 8 is a schematic flowchart of a method for implementing speech control according to an embodiment of the present description.

With reference to the foregoing description, FIG. 8 shows a method for implementing speech control according to an aspect of the present description. The method includes:

Step 11: A terminal records a correspondence between a first keyword text and a second keyword text.

Step 12: When a user inputs a speech, the terminal cooperates with a server to parse the speech input by the user and executes a function. Step 12 specifically includes:

Step 121: The terminal sends, to a first server for semantic parsing and logical parsing, the speech input by the user.

Step 122: When the first server returns a parsing failure, the terminal obtains a parsed text returned by the first server, replaces the second keyword in the parsed text with the first keyword based on the correspondence, and then sends, to the first server, the text obtained after the replacement.

Step 123: The terminal receives a control command structure returned by the first server after the logical parsing succeeds, and executes a function based on the control command structure, to play a notification speech.

Persons skilled in the art may understand that, for ease of description, the first server and a speech cloud are used interchangeably, and a second server and an IoT cloud are used interchangeably.

In this embodiment of the present description, the terminal performs recognition, replacement, and inverse replacement on a non-standard keyword, to implement speech recognition and speech control on a personalized parameter of the user. The non-standard keyword exists because a smart household provides a function of modifying a device attribute to meet a common habit of the user. The user can change a standard keyword (for example, a "living room" in information about rooms) to a non-standard keyword (for example, a "large room") that meets a habitual use of the user. Therefore, in step 11, when the user changes the first keyword text to the second keyword text, the terminal records the correspondence between the first keyword text and the second keyword text, or the terminal obtains the correspondence between the first keyword text and the second keyword text from the second server and records the correspondence. In other words, the terminal can easily obtain, from the IoT cloud, a keyword on which a modification is performed and content obtained after the modification.

With reference to FIG. 3, in step S12 in which the terminal cooperates with a server to parse the speech input by the user and executes a function, an original procedure of "a result is directly returned after a speech is submitted" includes the following processing process.

Step 121: The terminal uploads the speech input by the user to a speech cloud for speech recognition including semantic parsing and logical parsing, and waits for the speech cloud to return a recognition result.

Figure 4:
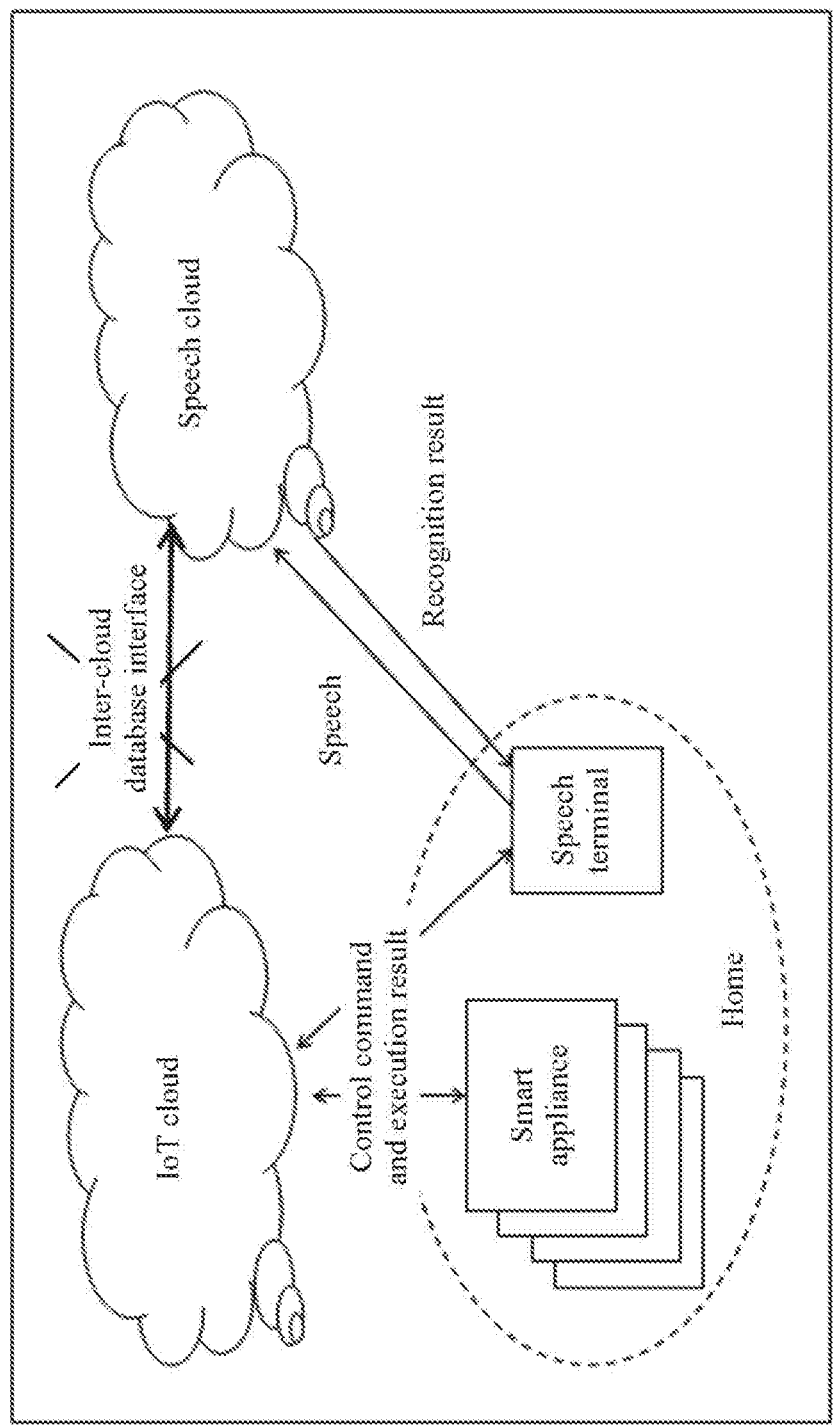
FIG. 4 is a schematic structural diagram of a system for implementing speech control according to an embodiment of the present description.

It can be learned with reference to FIG. 4 that, in this embodiment of the present description, when the speech cloud cannot parse the non-standard keyword, the terminal replaces the non-standard keyword with the standard keyword and sends the text obtained after the replacement to the speech cloud. In this way, the speech cloud does not need to establish an inter-cloud database interface to search the IoT cloud for the corresponding standard keyword, and does not need to rely on another service provider, reducing costs and improving information security.

Optionally, when sending the speech input by the user to the speech cloud for semantic parsing and logical parsing, the terminal uploads a personalized word list (non-standard keywords) of the user to the speech cloud, to achieve a relatively high speech recognition rate. Accuracy of recognizing a user-defined word may be improved based on a service provided by the speech cloud, generally, a standard function that can be provided by a speech recognition service, to obtain a better effect after use. A client uploads a speech (a recorded file), and the speech cloud performs speech parsing and semantic parsing based on a standard procedure. The speech parsing has relatively high accuracy because of the word list in the foregoing step.

When the non-standard keyword exists in the speech of the user, semantic recognition of the speech cloud for a control command fails due to a lack of a keyword (for example, a lack of room information). In this case, in step 122, the terminal performs replacement on a returned speech recognition text based on the non-standard keywords in the word list, replaces a non-standard keyword (for example, a "large room") with a standard keyword (for example, a "living room" or a standard keyword of this type provided that the terminal keeps a record and recognition and subsequent inverse replacement of the speech cloud are not affected), and may record the replacement in a program.

Afterwards, the terminal re-uploads a standardized control command text character string (text character string) obtained after the replacement, and the speech cloud performs semantic recognition. In this case, the text character string uses the standard word, and semantic recognition succeeds.

When the speech cloud returns the control command structure obtained after the semantic parsing, in step 123, the terminal performs inverse replacement based on the foregoing replacement, and generates a control command that can actually correspond to a device.

Then, the terminal generates the notification speech based on a command execution result by using the non-standard keyword, to notify the user of the execution result (to be specific, when the terminal notifies the user, the user can understand the execution result only when the room information is the "large room" said by the user).

Herein, an original process of speech recognition and semantic recognition that are completed by the speech cloud is divided into two phases, and a non-standard semantic recognition process is standardized by using a correspondence that is between a standard keyword and a non-standard keyword and that is known to the terminal.

Figure 5:
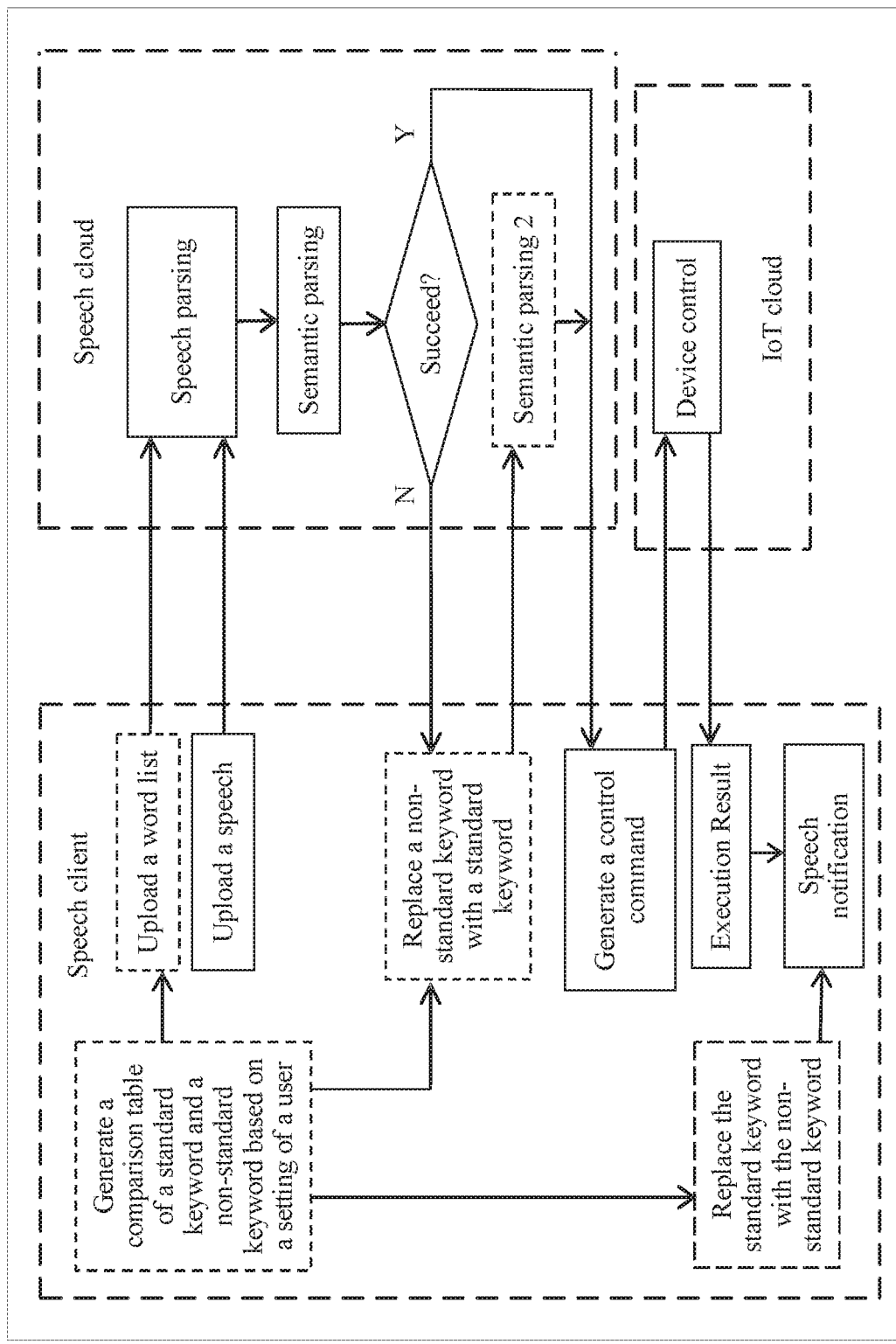
FIG. 5 is a schematic flowchart of a method for implementing speech control according to an embodiment of the present description.

The foregoing processing process is shown in FIG. 5. A newly added processing process is in a dashed-line box and includes the following description.

The non-standard keyword is content that is obtained after the user performs a modification on the standard keyword. After the user makes the modification and stores the non-standard keyword, the terminal or the IoT cloud records the non-standard keyword and a type corresponding to the non-standard keyword, and may generate different word lists based on the type.

In a process of replacing the non-standard keyword with the standard keyword, a speech terminal performs determining by using a method of matching the non-standard keyword in a speech recognition text returned by the speech cloud. The terminal replaces, with one standard keyword of a same type, content that can be matched (software of the terminal can randomly specify the standard keyword, and usually, for ease of understanding and manual recognition, a first standard keyword is selected), and records the type of the replacement, so that an actual device is replaced when the speech cloud returns the control command.

A same type of keyword appears only once in one sentence (one command can control one device in one room). Therefore, after the speech cloud successfully completes the semantic parsing ("semantic parsing 2" in the figure), the corresponding type in the command structure is replaced with the foregoing non-standard keyword obtained through matching.

By using several steps in the foregoing process (correspondingly shown in a dashed-line box in FIG. 6), speech recognition for the non-standard keyword of the user is completed without modifying a command parsing process of the speech cloud and without providing an interface for the speech cloud to obtain information of all users.

Figure 6:
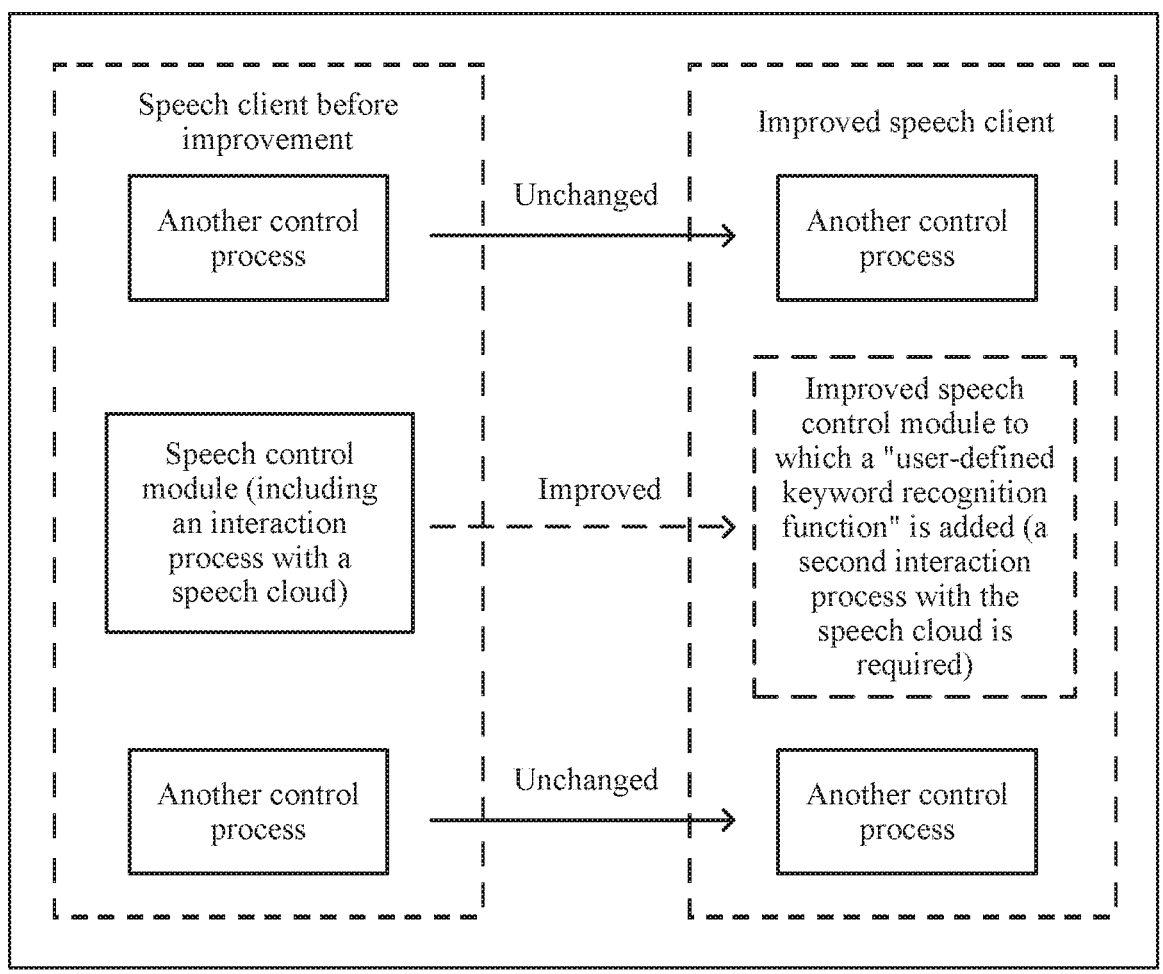
FIG. 6 is a schematic diagram of an improvement of a terminal for implementing speech control according to an embodiment of the present description.

With reference to FIG. 6, in some embodiments of the present description, a software module required for completing the process is implemented in the terminal. In other words, a "user-defined keyword recognition function" (a module in a dashed-line box in FIG. 6) needs to be added to an original speech control module in the speech terminal.

Figure 7:
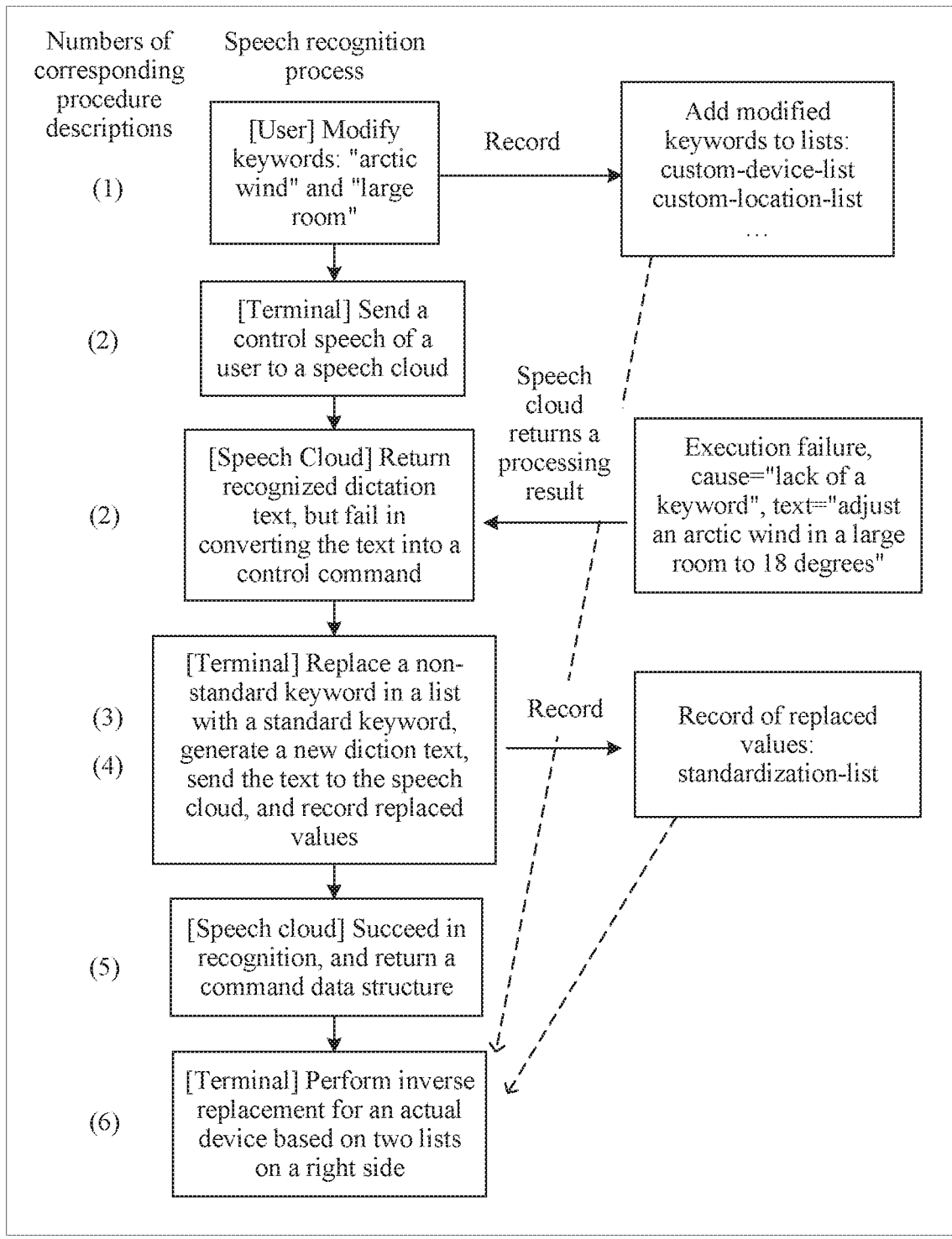
FIG. 7 is a schematic diagram of a process of implementing speech control according to an embodiment of the present description.

The original speech control module sends a speech to the speech cloud, the speech cloud returns a recognition success result or a recognition failure result, and a speech control command is executed only when the recognition succeeds. Different from the foregoing process, an example procedure is shown in FIG. 7. A process of processing a speech command in this method is as follows:

(1) When a device is set, a standard device parameter profile is first provided. The standard device parameter profile includes a list of standard device names such as an "air conditioner" and a list of standard rooms such as a "living room". If a user modifies an item in the profile, a client records all items modified by the user and modified values (the user may modify a plurality of devices in a home) into different lists. For example, a modified device name is recorded in a "custom-device-list", and a name of a room of a modified device is recorded in a "custom-location-list". Each different modified value is recorded as one time in the list. Items of the list have different content. Each record further corresponds to an original standard name. For example, the user names an air conditioner "arctic wind". An item of "arctic wind, air conditioner" exists in the "custom-device-list". A standard room name may be randomly designated for a room, for example, "living room, large room". A recording sequence is "standard keyword, non-standard keyword".

(2) A terminal first sends a speech of the user to a speech cloud, for example, "adjust the arctic wind in the large room to 18 degrees". In this case, speech content can be recognized by the speech cloud but cannot be converted into a control command. The speech cloud returns {execution failure, cause="lack of a keyword", text="adjust the arctic wind in the large room to 18 degrees"}. The terminal recognizes this command, and enters a standardization processing process.

(3) The terminal first matches non-standard keywords in all lists such as the foregoing "custom-device-list" and "custom-location-list" (there may alternatively be more lists, and a quantity of lists is equal to a quantity of keywords that can be modified) with the text (referred to as a "dictation text") returned by the speech cloud; and searches the "dictation text" for each non-standard keyword. Two values: "arctic wind" and "large room" that can be found in the foregoing speech control are respectively located in the two lists: "custom-device-list" and "custom-location-list".

(4) Standardization replacement is performed on the two values, to be specific, the "arctic wind" in the text is replaced with the "air conditioner", and the "large room" is replaced with the "living room". A pair of a replacement type and an original value, to be specific, "device, arctic wind" and "location, large room", are recorded. The control speech text of the user is changed to "adjust the air conditioner in the living room to 18 degrees" and is recorded as a "standardization-list".

(5) The text is sent to the speech cloud for semantic recognition. The speech cloud can return a correct recognition result {execution success, device="air conditioner", action="adjust temperature", parameter="18", location="living room", text="adjust the air conditioner in the living room to 18 degrees"}.

(6) The terminal obtains the recognition result, and finds that two values: "device" and "location" are replaced in the result by comparing with the "standardization-list". Therefore, the terminal performs inverse replacement on the result, and ignores an irrelevant part. A device control parameter list is changed to {device="arctic wind", action="adjust temperature", parameter="18", location="large room"). Because both the terminal and an IoT cloud record and control a device based on the parameter, a home appliance device can be correctly controlled based on the parameter.

In the foregoing process, a speech recognition process of a non-standard keyword is completed.

In conclusion, according to the method for implementing speech recognition by a terminal in this embodiment of the present description, recognition and processing for a user-defined keyword can be implemented, to improve a speech recognition rate and a semantic recognition rate of a control command. The resolving method is irrelevant to a modification made by a user. A system does not need to be updated based on the modification made by the user. A problem that a speech command cannot be recognized due to a personalized design is resolved. In the method, no extra server interface is needed, an inter-cloud interface is avoided, a quantity of ports under a network attack is reduced, high network and information security is implemented, the cloud does not need to recognize the user before processing non-standard information of the user, and local decentralized processing efficiency is high. In addition, according to the method, interface standardization is implemented, and coupling to and independence on a speech service provider are reduced, facilitating popularization and flexible selection for a supplier, and reducing a probability of exposing personal private information of the user and all user information of an enterprise to the outside, thereby protecting privacy and a business secret. The method is implemented by using software on a terminal side without speech service upgrade and maintenance. Therefore, costs are low.

With reference to the method description, in another aspect, an embodiment of the present description provides a terminal for implementing speech control. The terminal includes a recording unit, a first sending unit, a replacement unit, and an execution unit. The recording unit is configured to record a correspondence between a first keyword text and a second keyword text. When a user inputs a speech, the first sending unit is configured to send, to a first server for semantic parsing and logical parsing, the speech input by the user. The replacement unit is configured to: when the first server returns a parsing failure, obtain a parsed text returned by the first server, replace the second keyword in the parsed text with the first keyword based on the correspondence, and then send, to the first server, the text obtained after the replacement. The execution unit is configured to receive a control command structure returned by the first server after the logical parsing succeeds, and execute a function based on the control command structure, to play a notification speech.

In a possible implementation, the recording unit includes: a first recoding subunit, configured to: when the user changes the first keyword text to the second keyword text, record the correspondence between the first keyword text and the second keyword text.

In a possible implementation, the recording unit includes: a second recoding subunit, configured to: obtain, from a second server, the correspondence between the first keyword text and the second keyword text, and record the correspondence.

With reference to the embodiments of the third aspect of the present description, in a possible implementation, the recording unit further includes: a third recoding subunit, configured to record, in a word list, the first keyword text, the second keyword text, and the correspondence between the first keyword text and the second keyword text.

In a possible implementation, the third recording subunit is configured to record, in different word lists, first keyword texts, second keyword texts, and correspondences between the first keyword texts and the second keyword texts based on different types of the first keyword texts.

In a possible implementation, the replacement unit includes: a matching subunit, configured to match the second keyword text in the word list with the parsed text; and a replacement subunit, configured to: replace, with the corresponding first keyword, the second keyword obtained from the parsed text through matching, and send, to the first server, the text obtained after the replacement.

In a possible implementation, the execution unit includes: a replacement repeating subunit, configured to replace the first keyword text in the control command structure with the corresponding second keyword text; an execution subunit, configured to generate an executable control command based on the control command structure obtained after the replacement, and execute the control command; and a speech generation subunit, configured to: generate the notification speech based on the control command structure obtained after the replacement, and play the notification speech.

In a possible implementation, the replacement unit further includes: a replacement recording subunit, configured to: after the second keyword obtained from the parsed text through matching is replaced with the corresponding first keyword, keep a replacement record of the second keyword and the corresponding first keyword. The replacement repeating subunit is configured to replace the first keyword text in the control command structure with the corresponding second keyword text based on the replacement record.

In a possible implementation, the terminal further includes: a second sending unit, configured to: when the speech input by the user is sent to the first server for the semantic parsing and the logical parsing, send the correspondence between the first keyword text and the second keyword text to the first server.

For specific steps performed by units and subunits, refer to the description of the method. For brevity, details are not described again.

All or some of the embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of the present description are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

In conclusion, the foregoing embodiments are merely intended for describing the technical solutions of the present description, but not for limiting the present description. Although the present description is described in detail with reference to the embodiments, persons of ordinary skill in the art should understand that they may still make modifications to the technical solutions described in the embodiments or make equivalent replacements to some technical features thereof, without departing from the spirit and scope of the technical solutions of the embodiments of the present description.

What is claimed is:

1. A first terminal, comprising:
   a processor; and
   a memory coupled to the processor and storing one or more programs that, when executed by the processor, cause the first terminal to be configured to:
      record a correspondence between a standard keyword and a non-standard keyword;
      send, to a second terminal, a first control command corresponding to the standard keyword when the first terminal receives a first speech input, wherein the first speech input comprises the standard keyword; and
      when the first terminal receives a second speech input that comprises the non-standard keyword:
         parse the second speech input to recognize the non-standard keyword;
         search the correspondence to identify the second terminal when the first terminal recognizes the non-standard keyword; and
         send, to the second terminal, a second control command.

2. The first terminal of claim 1, wherein the one or more programs further cause the first terminal to be configured to record the correspondence when the first terminal detects an operation of modifying the standard keyword to correspond to the non-standard keyword.

3. The first terminal of claim 1, wherein the one or more programs further cause the first terminal to be configured to:
   generate first parsed text by parsing the first speech input;
   send the first parsed text to a cloud server; and
   receive the first control command from the cloud server.

4. The first terminal of claim 1, wherein the one or more programs further cause the first terminal to be configured to:
   generate first parsed text by parsing the second speech input;
   generate second parsed text according to the correspondence, wherein the second parsed text has a same meaning as the first parsed text and comprises the standard keyword;
   send the second parsed text to a server; and
   receive the second control command from the server after sending the second parsed text to the server.

5. The first terminal of claim 1, wherein the one or more programs further cause the first terminal to be configured to:
   generate first parsed text by parsing the second speech input;
   send the first parsed text to a server;
   receive parsing failure information from the server;
   generate second parsed text according to the correspondence, wherein the second parsed text has a same meaning as the first parsed text and comprises the standard keyword;
   send the second parsed text to the server; and
   receive the second control command from the server after sending the second parsed text to the server.

6. The first terminal of claim 1, wherein the first terminal is a smart household device or a mobile phone.

7. The first terminal of claim 1, wherein the standard keyword is a standard name of the second terminal.

8. The first terminal of claim 1, wherein the non-standard keyword comprises a personalized keyword of a user of the first terminal.

9. A speech control system, comprising:
   a second terminal; and
   a first terminal communicatively coupled to the second terminal and configured to:
      record a correspondence between a standard keyword and a non-standard keyword;
      send, to the second terminal, a first control command corresponding to the standard keyword when the first terminal receives a first speech input, wherein the first speech input comprises the standard keyword; and
      when the first terminal receives a second speech input that comprises the non-standard keyword:
         parse the second speech input to recognize the non-standard keyword;
         search the correspondence to identify the second terminal when the first terminal recognizes the non-standard keyword; and
         send, to the second terminal, a second control command, and
   wherein the second terminal is configured to perform a function based on the second control command.

10. The speech control system of claim 9, wherein the first terminal is further configured to record the correspondence when the first terminal detects an operation of modifying the standard keyword to correspond to the non-standard keyword.

11. The speech control system of claim 9, further comprising a server communicatively coupled to the first terminal, wherein the first terminal is further configured to:

generate first parsed text by parsing the first speech input; and send the first parsed text to the server, and wherein the server is configured to:

generate the first control command by parsing the first parsed text; and send the first control command to the first terminal.

12. The speech control system of claim 9, further comprising a server communicatively coupled to the first terminal, wherein the first terminal is further configured to:

generate first parsed text by parsing the second speech input;

generate second parsed text according to the correspondence, wherein the second parsed text has a same meaning as the first parsed text and comprises the standard keyword; and send the second parsed text to the server, and wherein the server is configured to:

generate the second control command by parsing the second parsed text; and send the second control command to the first terminal.

13. The speech control system of claim 9, further comprising a server communicatively coupled to the first terminal, wherein the first terminal is further configured to:

generate first parsed text by parsing the second speech input;

send the first parsed text to the server;

generate second parsed text according to the correspondence when the first terminal receives parsing failure information from the server, wherein the second parsed text has a same meaning as the first parsed text and comprises the standard keyword; and send the second parsed text to the server, and wherein the server is configured to:

send parsing failure information to the first terminal when the server fails to parse the second parsed text; and send, to the first terminal, the second control command when the server successfully parses the second parsed text.

14. The speech control system of claim 13, wherein the server is a cloud server.

15. The speech control system of claim 9, wherein the first terminal is a smart household device or a mobile phone.

16. The speech control system of claim 9, wherein the second terminal is a home appliance device or a car.

17. The speech control system of claim 9, wherein the standard keyword is a standard name of the second terminal.

18. The speech control system of claim 9, wherein the non-standard keyword comprises a personalized keyword of a user of the terminal.

19. A method implemented by a first terminal, the method comprising:

recording a correspondence between a standard keyword and a non-standard keyword;

sending, to a second terminal, a first control command corresponding to the standard keyword when the first terminal receives a first speech input, wherein the first speech input comprises the standard keyword; and when the first terminal receives a second speech input that comprises the non-standard keyword:

parsing the second speech input to recognize the non-standard keyword;

searching the correspondence to identify the second terminal when the first terminal recognizes the non-standard keyword; and sending, to the second terminal, a second control command.

\* \* \* \* \*